United States Patent
Healy (10) Patent No.: US 7,415,324 B2
(45) Date of Patent: Aug. 19, 2008

(54) VEHICLE WHEEL ALIGNMENT ADJUSTMENT METHOD

(75) Inventor: Donald A. Healy, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 725 days.

(21) Appl. No.: 10/902,138

(22) Filed: Jul. 30, 2004

(65) Prior Publication Data

US 2005/0022398 A1 Feb. 3, 2005

Related U.S. Application Data

(60) Provisional application No. 60/491,275, filed on Jul. 31, 2003.

(51) Int. Cl.
*G05D 1/00* (2006.01)

(52) U.S. Cl. .............................. 701/1; 701/69; 701/81; 701/89; 33/203.18

(58) Field of Classification Search ................. 701/1, 701/69, 81, 89; 33/288; 356/139.09
See application file for complete search history.

(56) References Cited

U.S. PATENT DOCUMENTS

| | | | |
|---|---|---|---|
| 3,686,770 A | | 8/1972 | Davis |
| 4,106,208 A | * | 8/1978 | Hunter ........................ 33/288 |
| 4,718,759 A | * | 1/1988 | Butler .................... 356/139.09 |
| 4,931,964 A | | 6/1990 | Titsworth et al. |
| 5,535,522 A | | 7/1996 | Jackson |
| 5,724,129 A | | 3/1998 | Matteucci |
| 5,809,658 A | | 9/1998 | Jackson et al. |
| 5,943,783 A | | 8/1999 | Jackson |
| 5,969,246 A | | 10/1999 | Jackson et al. |
| 6,134,792 A | | 10/2000 | January |
| 6,148,528 A | | 11/2000 | Jackson |
| 6,237,234 B1 | | 5/2001 | Jackson et al. |
| 6,560,883 B2 | | 5/2003 | Jackson et al. |
| 2003/0030791 A1 | * | 2/2003 | O'Harra ................. 356/139.09 |
| 2003/0051356 A1 | | 3/2003 | Jackson et al. |
| 2003/0065466 A1 | | 4/2003 | Jackson et al. |

FOREIGN PATENT DOCUMENTS

WO WO 01/23834 4/2001

OTHER PUBLICATIONS

"Wheel Alignment", Arago™ Technology V3D[3,] 2nd To None, John Bean.

(Continued)

*Primary Examiner*—Gertrude Arthur Jeangla
(74) *Attorney, Agent, or Firm*—McDermott Will & Emery LLP (57) ABSTRACT

A method for measuring and aligning front and rear wheels of a four wheel vehicle, including measuring alignment properties of the front wheels, and correcting alignment properties of the rear wheels if all of the measurements of the alignment properties of the front wheels are substantially equal to the manufacturer-specified alignment properties for the front wheels. If all of the measurements of the alignment properties of the front wheels are not substantially equal to the manufacturer-specified alignment properties for the front wheels, then the alignment properties of the front wheels are corrected prior to correcting alignment properties of the rear wheels. The measurements of the alignment properties can be made using a computer-aided, three-dimensional machine vision alignment apparatus.

20 Claims, 6 Drawing Sheets

OTHER PUBLICATIONS

"Opto-Plus 618" Computer Wheel Aligner, The 8-sensor "Around the Car" measurement optimizes 4-Wheel alignment.

"Wheel Balance and Alignment", Chaper 14.

"WinAlign HD", Wheel Alignment Education Guide for Heavy-Duty Trucks, Hunter Engineering Company.

Hunter Series 311, Series 311 Upgradeable Computerized Wheel Alignment System.

DSP400 Sensor Specifications and Options, DSP400 Alignment Sensors.

"211/411 To 611 Upgrade", Form 4414T. Jul. 1999.

Series 611 Computerized Wheel Alignment System, Form 4484T. May 2000.

DSP250 & 300 Series Sendors For Hunter Computerized wheel Alignment Systems.

Specialty Products Company, "Basic Wheel Alignment Fundamentals".

Audi Product Literature, "Workshop Manual Audi A8 1994>,Booklet: FWD and 4WD Running Gear", Edition: Aug. 1996, select pages including index and pp. 44-14 through 44-21 describing required front-to-rear alignment work sequence (9 pages total).

Audi Product Literature, "Workshop Manual Audi TT 1999> Booklet: Running gear, Front-wheel drive and four-wheel drive", Edition: Oct. 1999, select pages including index and pp. 44-14 through 44-16,describing required front-to-rear alignment work sequence (4 pages total).

Volkswagen Product Literature "Repair Manual Golf, Jetta—Booklet: Suspension, Wheels Steering" Edition: Dec. 1998, (W42 007 198 111), select pages including Index and pp. 4-5 and 44-6 describing required front-to-rear alignment work sequences (5 pages total).

Volkswagen Product Literature "Workshop Manual New Beetle 1999> Booklet: Running gear, axles steering" Edition: Sep. 1999, select pages including Index and pp. 44-6 through 44-7 describing required front-to-rear alignment work sequence (4 pages total).

Hunter Engineering Co. Product Literature Form No. 4230T : "1998 Volkswagen Passat-Four Link Suspension and Alignment-Service Training Technician Reference Guide", dated Oct. 1999, bound pp. 1-63, (See Specifically, p. 29, Figures 12-Figures 34 Illustrating front to-rear sequence in vehicle alignment procedure.).

Hunter Engineering Co. Product Literature "Audi A8 Suspension and Alignment-Service Training Course Handout" (See Specifically-Hunter WinAlign Software Flow Chart, p. 88, dated Jul. 17, 1995 Illustrating front-to-rear sequence In alignment procedure).

"OPTO-PLUS 618" Computer Wheel Aligner, The 8-sensor "Around the Car" measurement optimizes 4-Wheel alignment.

"WHEEL BALANCE AND ALIGNMENT", Chapter 14.

"WinAlign HD", Wheel Alignment Education Guide for Heavy-Duty Trucks, HUNTER Engineering Company.

Hunter Series 311, Series 311 Upgradable Compiuterized Wheel Alignment System.

"211/411 To 611 Upgrade", Form 4414T. 07/99.

Series 611 Computerized Wheel Alignment System, Form 4484.T 05/00.

"DSP250 & 300 Series Sendors" For Hunter Computerized wheel Alignment Systems.

Specialty Products Company, "Basic Wheel Alignment Fundamentals".

"Wheel Alignment", Arago™ Technology V3D$^3$ 2$^{nd}$ To None, John Bean.

* cited by examiner

VEHICLE WHEEL ALIGNMENT ADJUSTMENT METHOD

CROSS-REFERENCE TO RELATED APPLICATION

The present application claims priority from now abandoned provisional U.S. patent application Ser. No. 60/491,275, filed Jul. 31, 2003, which is incorporated herein by reference in its entirety.

FIELD OF THE DISCLOSURE

The present disclosure generally relates to motor vehicle maintenance equipment and methods and, more specifically, to a method for adjusting the wheel alignment of a motor vehicle.

BACKGROUND OF THE DISCLOSURE

Motor vehicle alignment systems are important for ensuring that the alignments of wheels on a vehicle are within the specifications provided by motor vehicle manufacturers. If the wheels are out of alignment, there may be excessive or uneven wear of the tires and vehicle suspension system. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim."

The wheels of a motor vehicle may be aligned in a number of ways. For example, an operator or an alignment technician can use a vision imaging system such as a computer-aided, three-dimensional (3D) machine vision that employs optical sensing devices, such as cameras, to determine the positions of various objects. Examples of such apparatus and methods are disclosed in U.S. Pat. No. 5,724,743, entitled "Method and Apparatus for Determining the Alignment of Motor Vehicle Wheels" issued to Jackson, et al. on Mar. 10, 1998; U.S. Pat. No. 5,535,522, entitled "Method and Apparatus for Determining the Alignment of Motor Vehicle Wheels" issued to Jackson, et al. on Jul. 16, 1996; and Published U.S. patent application No. U.S. 2003/0065466A1, published Apr. 3, 2003, to Jackson, et al. and entitled "Self-Calibrating, Multi-Camera Machine Vision Measuring System". All three of these patents and patent application are assigned to the assignee of the present invention and incorporated herein by reference. The Visualiner $3D^3$ Arago™ Aligner (Model # EEWA533A), for example, is a vision imaging alignment system that is available from the John Bean Company of Conway, Ark. (www.johnbean.com).

During an alignment process, a number of parameters are measured and adjusted to achieve proper wheel alignment. These parameters include camber, caster, steering axis inclination (SAI) and toe.

Camber is the angle of the wheel, measured in degrees, when viewed from the front of the vehicle. If the top of the wheel is leaning out from the center of the car, then the camber is positive, if the top of the wheel is leaning in, then the camber is negative. If the camber is out of adjustment, it will cause tire wear on one side of the tire's tread. If the camber is too far negative, for instance, then the tire will wear on the inside of the tread.

Caster is the angle of a steering pivot that the front wheels turn on, measured in degrees, when viewed from the side of the vehicle. If the top of the pivot is leaning toward the rear of the car, then the caster is positive, if the top of the pivot is leaning toward the front of the car, then the caster is negative. If the caster is out of adjustment, it can cause problems in straight line tracking. If the caster is different from side to side, the vehicle will pull to the side with the less positive caster. If the caster is equal but too negative, the steering will be light and the vehicle will wander and be difficult to keep in a straight line. If the caster is equal but too positive, the steering will be heavy and the steering wheel may kick when the vehicle hits a bump. Positive caster settings provide a greater degree of steering efforts, self-centering and stability to the vehicle. Therefore, nearly every car has a positive caster setting.

The toe measurement is the difference in the distance between the front of the tires and the back of the tires. It is measured in fractions or decimals of an inch in the US and is usually set close to zero which means that the wheels are parallel with each other. Toe-in means that the fronts of the tires are closer to each other than the rears. Toe-out is just the opposite. An incorrect toe-in will cause rapid tire wear to both tires equally.

SAI is the measurement in degrees of the steering pivot line when viewed from the front of the vehicle. This angle, when added to the camber to form the included angle causes the vehicle to lift slightly when you turn the wheel away from a straight ahead position. This action uses the weight of the vehicle to cause the steering wheel to return to the center when you let go of the steering wheel after making a turn. Because of this, if the SAI is different from side to side, the SAI will cause a pull at very slow speeds. Most alignment machines have a way to measure SAI; however it is not separately adjustable. The most likely cause for SAI being out is bent parts which must be replaced to correct the condition. SAI is also referred to as KPI (King Pin Inclination) on trucks and old cars with king pins instead of ball joints.

Camber, caster, and SAI are typically measured using inclinometers attached to the wheel. With camber, the inclinometer measures the angle that the plane of the wheel makes with the vertical. To measure caster, the wheel is turned through an arc, and the difference in the camber readings is used to derive the caster value. This procedure is called a caster swing.

SAI is measured in a manner similar to caster, except that the inclinometer used for the SAI reading measures the change in pitch angle of a line in the plane of the wheel as the wheel is turned through an arc. The SAI measuring inclinometer is aligned at 90° to the inclinometer used for reading camber and caster.

A typical alignment procedure includes first measuring the camber of the rear tires and the toe of the rear tires. Then the caster, the camber and the toe of the front tires are measured. Normally, this procedure produces accurate results. However, if the front wheels are not in near correct specification, then the camber and toe measurements of the rear tires will not be accurate. For example, if the front cradle is shifted and/or the front wheels are out of location, the adjustments made to the rear wheels will reference an inaccurate front center point.

Based on the foregoing, there is a clear need in this field for a new and improved method for measuring and adjusting the alignment of the wheels of a motor vehicle. In particular, what is needed is a new and improved method for measuring and adjusting the alignment of the wheels of a motor vehicle that takes into account that measurements and adjustments of the rear wheels of a vehicle can be effected by front wheels that are not in near correct specification.

SUMMARY OF THE DISCLOSURE

The present disclosure accordingly provides a method for measuring and aligning front and rear wheels of a four wheel vehicle. The method generally includes measuring alignment properties of the front wheels, and comparing the measured alignment properties to manufacturer-specified alignment properties for the front wheels. If all of the measurements of the alignment properties of the front wheels are substantially equal to the manufacturer-specified alignment properties for the front wheels, then alignment properties of the rear wheels are measured (if not already measured simultaneously with the front wheels) and the measured alignment properties of the rear wheels are compared to manufacturer-specified alignment properties for the rear wheels. The alignment properties of the rear wheels are corrected if the measured alignment properties of the rear wheels are not substantially equal to the manufacturer-specified alignment properties for the rear wheels. However, if all of the measurements of the alignment properties of the front wheels are not substantially equal to the manufacturer-specified alignment properties for the front wheels, the alignment properties of the front wheels are corrected prior to measuring and correcting alignment properties of the rear wheels.

The present invention provides a new and improved method for measuring and adjusting the alignment of the wheels of a motor vehicle. In particular, the present invention provides a new and improved method for measuring and adjusting the alignment of the wheels of a motor vehicle that takes into account that measurements and adjustments of the rear wheels of a vehicle can be effected by front wheels that are not in near correct specification.

According to one aspect of the present disclosure, the alignment properties of the front wheels include castor angles. According to another aspect, the alignment properties of the front wheels include camber angles. According to an additional aspect, the alignment properties of the front wheels include a toe of the front wheels. According to a further aspect, the alignment properties of the front wheels include steering angle inclination.

According to a further aspect of the present disclosure, the alignment properties of the rear wheels include castor angles. According to another aspect, the alignment properties of the rear wheels include camber angles. According to an additional aspect, the alignment properties of the rear wheels include a toe of the rear wheels.

According to an additional aspect, the measurements are made using a computer-aided alignment apparatus. According to a further aspect, the computer aided alignment apparatus comprises a computer-aided, three-dimensional machine vision apparatus including optical scanning devices and optically scannable targets, and the method also includes attaching the optically scannable targets to the wheels of the vehicle, and optically scanning the targets to measure the alignment properties of the wheels.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF THE DISCLOSURE

Figure 3:
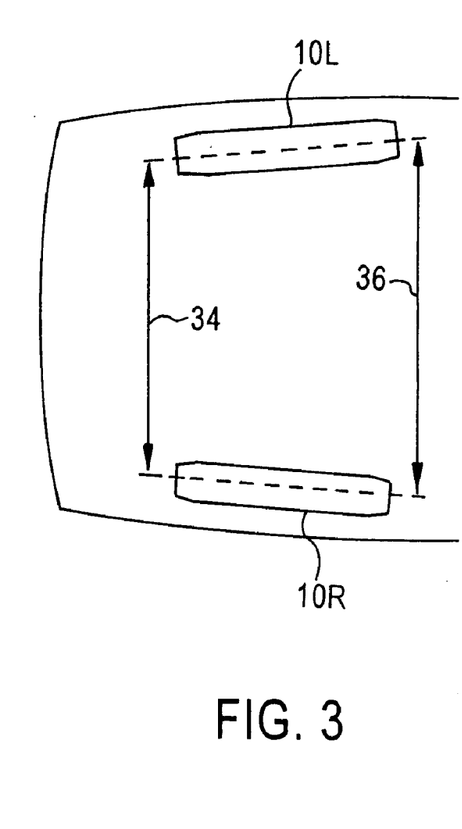
FIG. 3 is a bottom plan view of front wheels of a vehicle showing a toe of the wheels.
Figure 4:
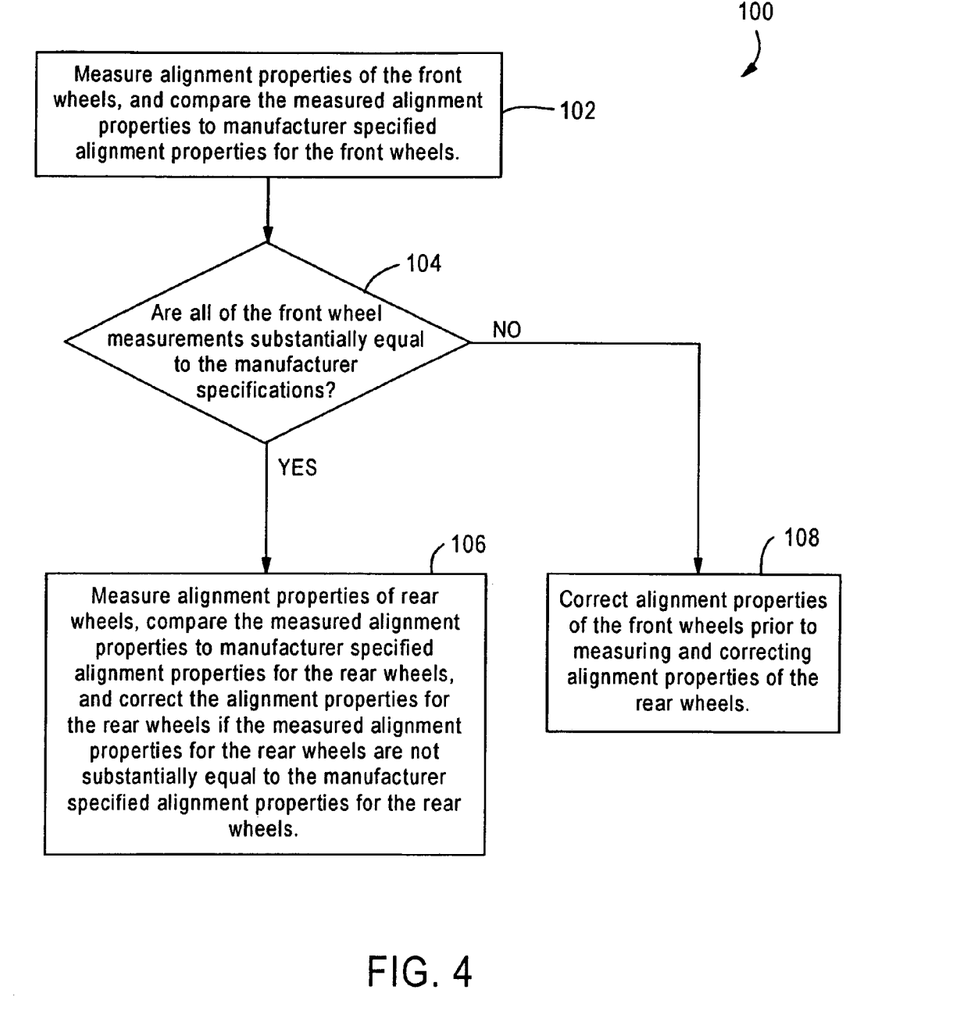
FIG. 4 is a flow chart illustrating a method according to the present disclosure for measuring and adjusting alignment of wheels of a vehicle.

Referring to FIG. 4, the present disclosure provides a method 100 for measuring and adjusting alignment of front and rear wheels of a four wheel vehicle. However, before the method 100 of FIG. 4 is discussed, a description of some alignment properties of wheels are provided in FIGS. 1 through 3.

Alignment Properties of Wheels of a Vehicle

During an alignment process, a number of parameters are measured and adjusted to achieve proper wheel alignment. These parameters can include camber, caster, toe and steering axis inclination.

Figure 1:
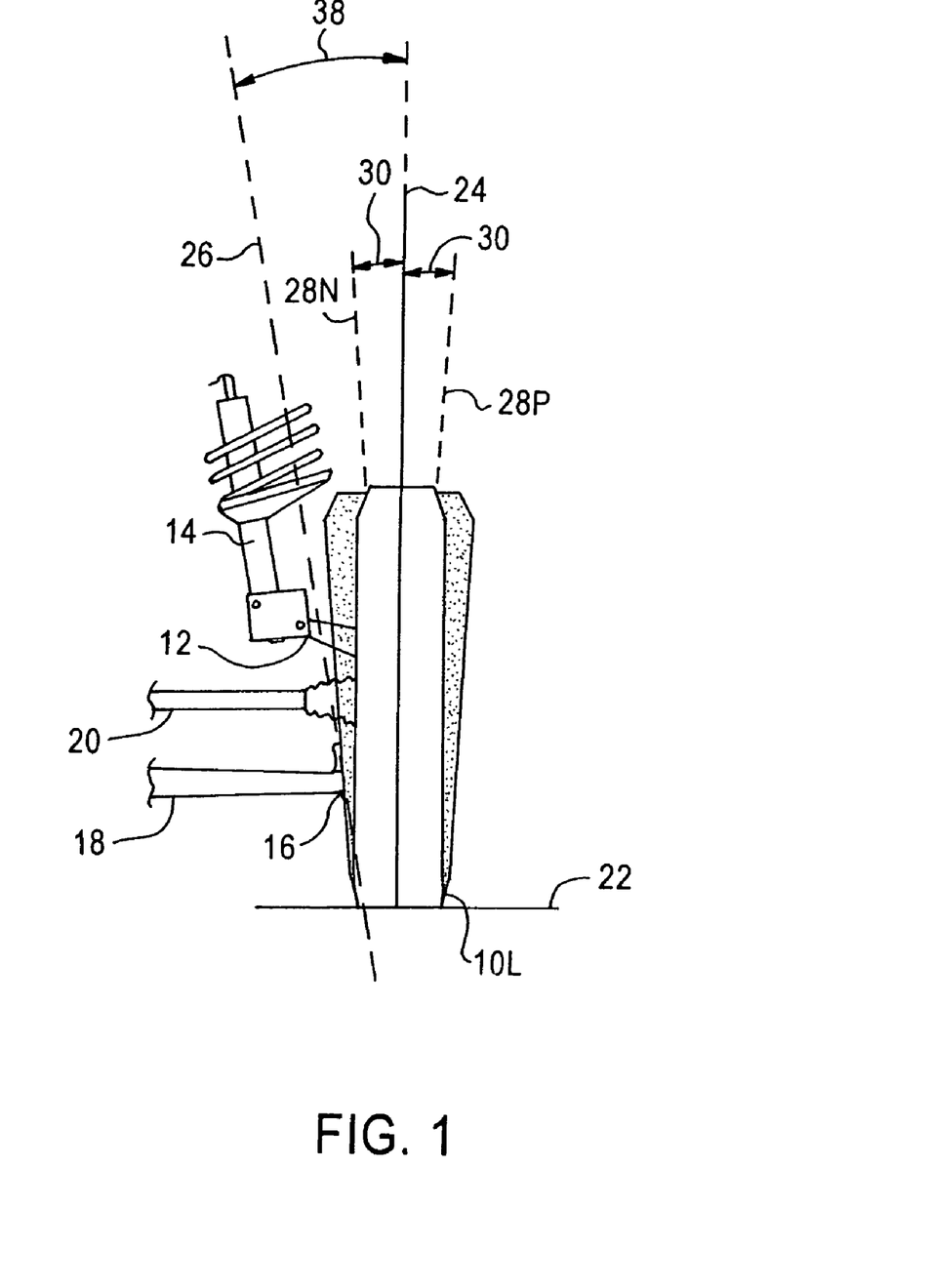
FIG. 1 is a front elevation view of a front wheel of a vehicle (e.g., an automobile having four wheels) showing alignment properties of the wheel, including positive and negative camber angles.

Referring first to FIG. 1, a front elevation view of an example of a left front wheel 10L of a vehicle (e.g., an automobile having four wheels) is shown. Connected to the wheel 10L through a first ball joint 12 is a shock-absorber assembly 14, and through a second ball joint 16 is a steering rod 18. The first ball joint 12 may simply comprise an adjustment point in later model automobiles. An axle 20 is also connected to the wheel 10L. The wheel 10L is shown supported on a ground plane 22 (e.g., a floor of an auto repair shop) and a "true vertical" line 24 is shown extending perpendicular from the ground plane 22 at about a center of a bottom of the wheel 10L, as viewed from the front. A steering pivot line 26 is shown passing through the ball joints 12, 16. Broken lines illustrate two possible centerlines 28N, 28P of the wheel 10L, as viewed from the front.

Still referring to FIG. 1, camber 30 is the angle, measured in degrees, between the front true vertical line 24 and the center line, 28P or 28N, of the wheel 10L, when viewed from the front of the vehicle. If the top of the wheel 10L is leaning out from the center of the car, as illustrated by the centerline 28P, then the camber 30 is positive. If the top of the wheel 10L is leaning in, as illustrated by the centerline 28N, then the camber 30 is negative. If the camber 30 is out of adjustment, it will cause tire wear on one side of the tire's tread. If the camber 30 is too far negative, for instance, then the tire will wear on the inside of the tread.

Figure 2:
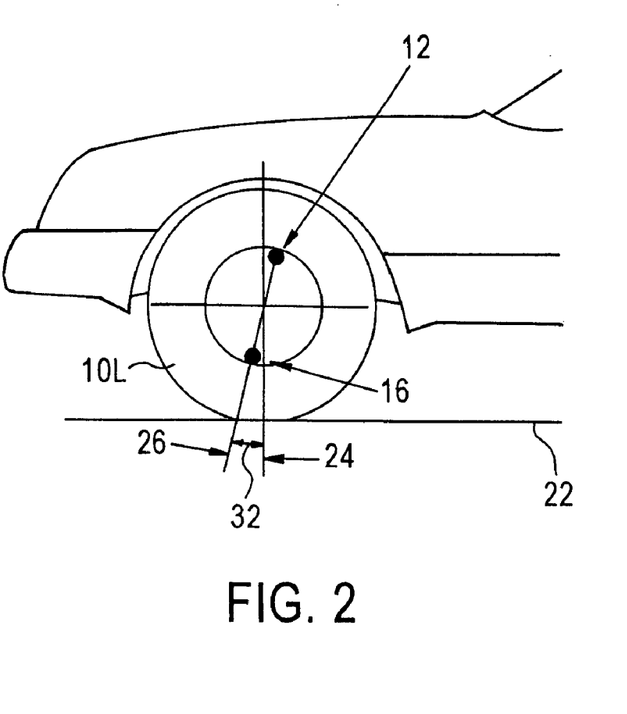
FIG. 2 is a side elevation view of a front wheel of a vehicle showing a steering pivot and a caster angle of the wheel.

Referring to FIG. 2, a side elevation view of the front wheel 10L is shown. The wheel 10L is shown supported on the ground surface 22 and the "true vertical" line 24 is shown extending perpendicular from the ground surface 22 at about a center of a bottom of the wheel 10L, as viewed from the side. Also illustrated is the steering pivot line 26 passing through the ball joints 12, 16.

Caster 32 is the angle, measured in degrees, between the steering pivot line 26 and the true vertical line 24 of the wheel 10L, when viewed from the side of the vehicle. If the top of the steering pivot line 26 is leaning toward the rear of the car, as illustrated in FIG. 2, then the caster 32 is positive. If the top of the steering pivot line 26 is leaning toward the front of the car, then the caster 32 is negative. If the caster 32 is out of adjustment, it can cause problems in straight line tracking. If the caster 32 is different from side to side, the vehicle will pull to the side with the less positive caster. If the caster 32 is equal but too negative, the steering will be light and the vehicle will wander and be difficult to keep in a straight line. If the caster 32 is equal but too positive, the steering will be heavy and the steering wheel 10L may kick when the vehicle hits a bump. Positive caster settings provide a greater degree of steering efforts, self-centering and stability to the vehicle. Therefore, nearly every car has a positive caster setting.

FIG. 3 is a bottom plan view of a pair of wheels, a front left wheel 10L and a front right wheel 10R of a vehicle. A toe measurement is the difference between a distance 34 between the front of the tires 10L, 10R and a distance 36 between the back of the tires 10L, 10R. The toe is measured in fractions or decimals of an inch in the United States and is usually set close to zero which means that the wheels 10L, 10R are parallel with each other. Toe-in means that the distance 34 between the front of the wheels 10L, 10R is less than the distance 36 between the back of the wheels 10L, 10R, as illustrated in FIG. 3. Toe-out means that the distance 34 between the front of the wheels 10L,10R is greater than the distance 36 between the back of the wheels. An incorrect toe setting will cause rapid tire wear to the tires of both wheels equally.

Referring back to FIG. 1, steering axis inclination (SAI) 38 is the measurement in degrees between the steering pivot line 26 and the true vertical line 24 when viewed from the front of the vehicle. This angle 38 causes the vehicle to lift slightly when the wheel 10L is turned away from a straight ahead position during driving. This action uses the weight of the vehicle to cause the steering wheel 10L to re-center when the steering wheel 10L is released after a turn is made. Because of this, if the SAI 38 is different from side to side, the SAI 38 will cause a pull at very slow speeds. Most alignment machines have a way to measure SAI 38; however it is often not separately adjustable. The most likely cause for SAI 38 being out is bent parts which must be replaced to correct the condition. SAI 38 is also referred to as KPI (King Pin Inclination) on trucks and old cars with king pins instead of ball joints.

The method 100 of FIG. 4 can be used to measure and adjust, if necessary, the camber, castor and toe of the front and rear wheels of a vehicle. The method 100 can also be used to measure and adjust, if necessary, the steering axis inclination of the front wheels of a vehicle.

Method for Measuring and Adjusting Alignment of Wheels of a Vehicle

Figure 5:
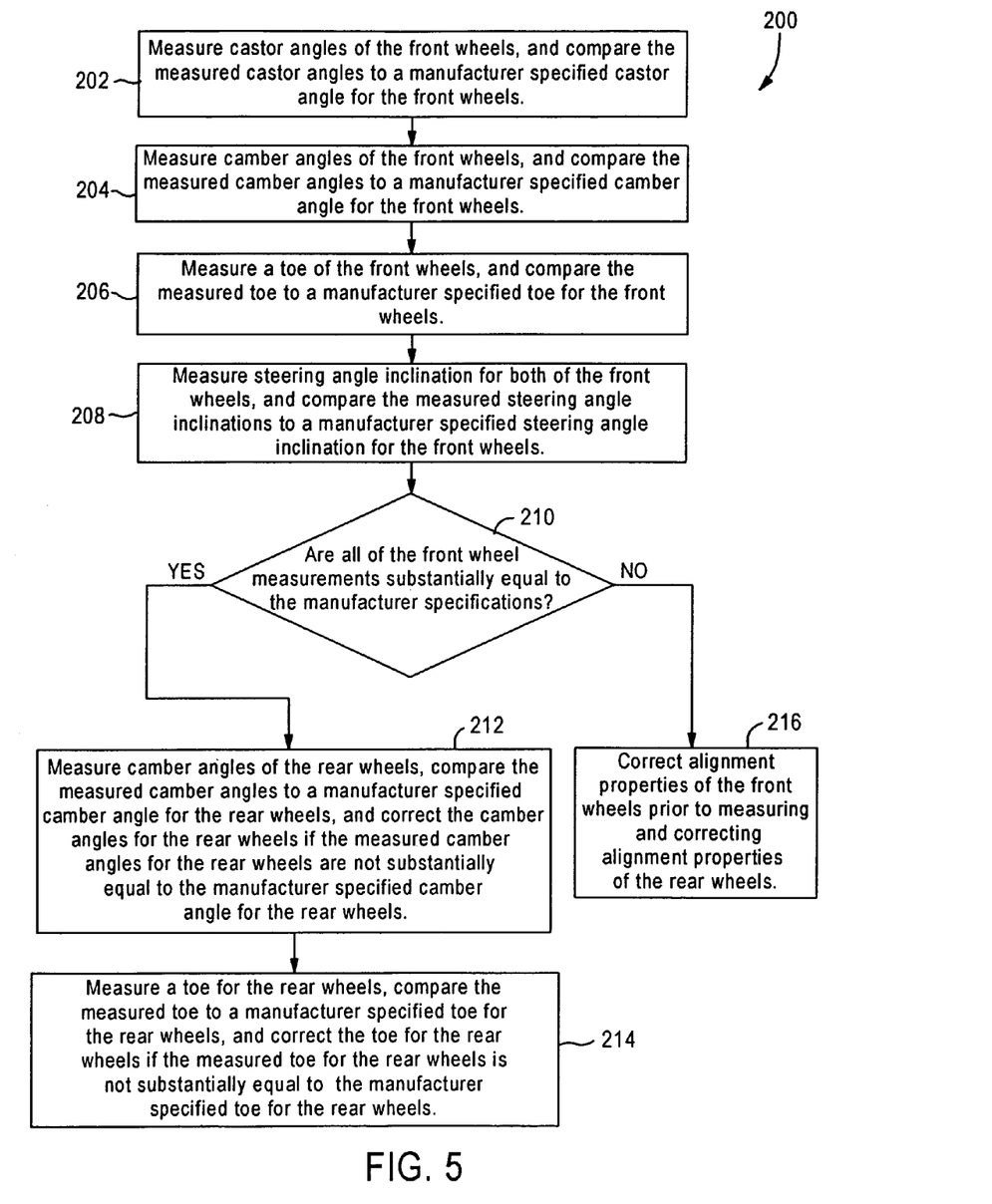
FIG. 5 is a flow chart illustrating a method according to the present disclosure for measuring and adjusting alignment of wheels of a vehicle.

Referring to FIG. 5, the method 10 of the present disclosure generally includes measuring alignment properties of the front wheels, and comparing the measured alignment properties to manufacturer-specified alignment properties for the front wheels, as shown at 102. The alignment properties can include castor, camber, toe and steering angle inclination, for example. If all of the measurements of the alignment properties of the front wheels are substantially equal to (or within a specified tolerance of) the manufacturer-specified alignment properties for the front wheels, as shown at 104, then alignment properties of the rear wheels are measured, if the alignment properties of the rear wheels have not already been measured simultaneously with the measurements of the alignment properties of the front wheels. The measured alignment properties of the rear wheels are compared to manufacturer-specified alignment properties for the rear wheels, as shown at 106. The alignment properties of the rear wheels are corrected if the measured alignment properties of the rear wheels are not substantially equal to (or within a specified tolerance of) the manufacturer-specified alignment properties for the rear wheels. However, if all of the measurements of the alignment properties of the front wheels are not substantially equal to the manufacturer-specified alignment properties for the front wheels, the alignment properties of the front wheels are corrected prior to measuring and correcting alignment properties of the rear wheels, as shown at 108.

Another exemplary embodiment of a method 200, according to the present disclosure, for measuring and adjusting alignment of front and rear wheels of a four wheel vehicle is shown. The method 200 includes first measuring castor angles of the front wheels and comparing the measured castor angles to a manufacturer-specified castor angle for the front wheels, as shown at 202. Then the camber angles of the front wheels are measured and compared to a manufacturer-specified camber angle for the front wheels, as shown at 204. A toe of the front wheels is then measured and compared to a manufacturer-specified toe for the front wheels, as shown at 206. The method 200 further includes measuring steering angle inclination for both of the front wheels, and comparing the measured steering angle inclinations to a manufacturer-specified steering angle inclination for the front wheels, as shown at 208.

If all of the front wheel measurements are substantially equal to (or within a specified tolerance of) the manufacturer-specifications, as shown at 210 of FIG. 5, then the camber angles of the rear wheels are measured (or retrieved if previously measured along with the measurements of the front wheels) and compared to a manufacturer-specified camber angle for the rear wheels, as shown at 212. In addition, the camber angles for the rear wheels are corrected if the measured camber angles for the rear wheels are not substantially equal to the manufacturer-specified camber angle for the rear wheels, as also shown at 212. A toe for the rear wheels is then measured and compared to a manufacturer-specified toe for the rear wheels, as shown at 214, and corrected if the measured toe for the rear wheels is not substantially equal to the manufacturer-specified toe for the rear wheels.

If all of the front wheel measurements are not substantially equal to (or within a specified tolerance of) the manufacturer specifications, as shown at 210 of FIG. 5, then the alignment properties of the front wheels are first corrected prior to measuring and correcting the alignment properties of the rear wheels, as shown at 216.

Figure 6:
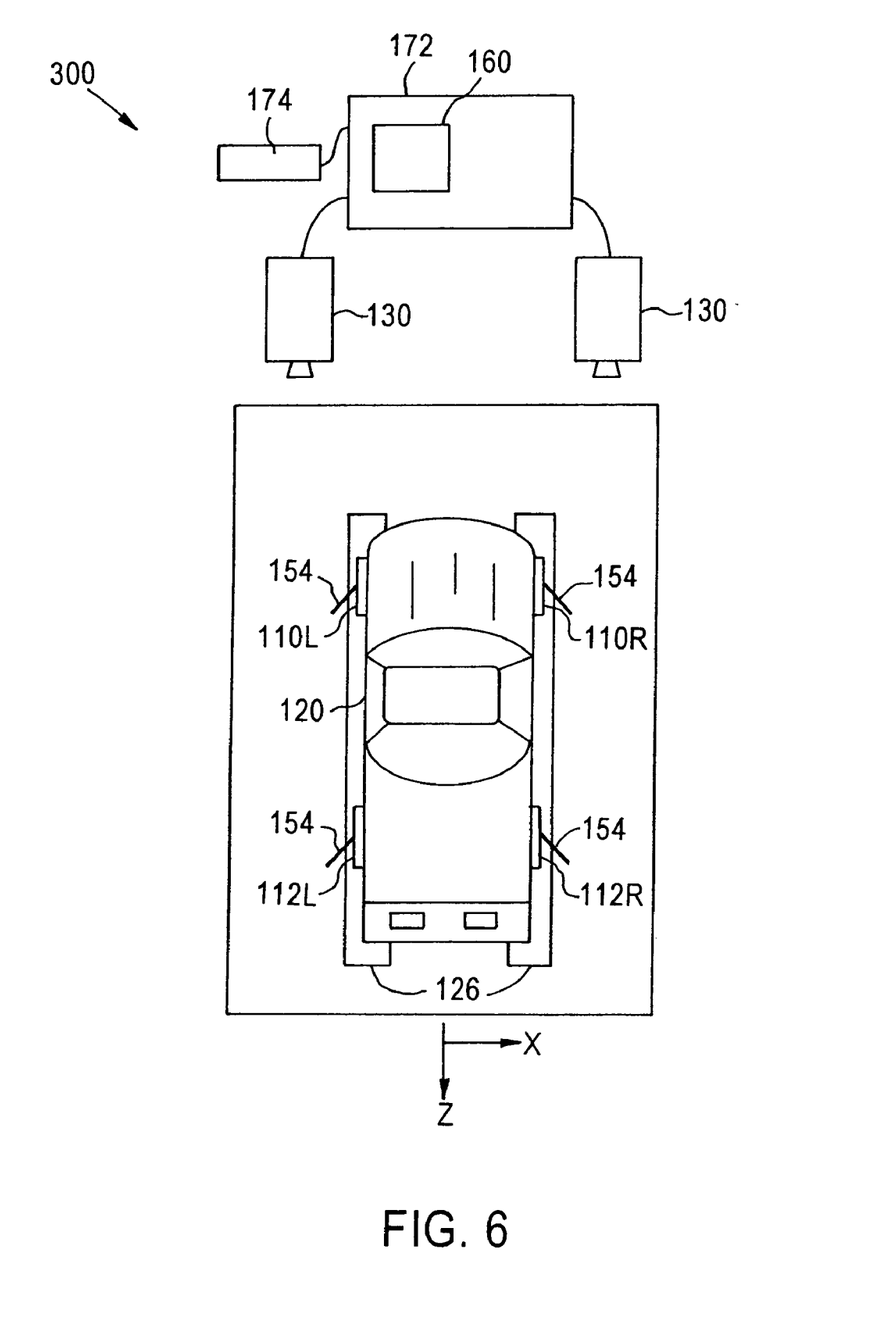
FIG. 6 is a perspective view of a computer-aided, three-dimensional (3D) machine vision alignment apparatus, which can be used for carrying out the methods of FIGS. 4 and 5.

Preferably, the methods 100, 200 of FIGS. 4 and 5 are conducted using a computer-aided, three-dimensional motor vehicle wheel alignment apparatus 300 ("alignment apparatus"), such as the type shown in FIG. 6. The Visualiner 3D³ Arago™ Aligner (Model # EEWA533A), for example, is an alignment apparatus that can be used to determine the alignment properties of the wheels of a vehicle in accordance with the present invention, and is available from the John Bean Company of Conway, Ark. (www.johnbean.com). The Visualiner 3D³ Arago™ Aligner advances "Error-Free" alignment technology with the use of 3 Self-Synchronizing Digital cameras and Automatic Height Indexing (although, FIG. 6 only shows a two cameras). It should be noted though that the presently disclosed methods 100, 200 are not meant to be limited to a particular wheel alignment apparatus, and can be carried out using other types of computer-aided alignment systems, such as a single-camera alignment apparatus or alignment systems using head units which attach to various wheels and communicate with cables or optical sensors.

Alignment Apparatus

FIG. 6 is a block diagram illustrating the alignment apparatus 300 for measuring and adjusting alignment of front wheels 110L and 110R and rear wheels 112L and 112 of a four wheel vehicle 120 in accordance with the present invention. As depicted, the vehicle 120 is mounted on a vehicle supporting means that might include for example a lift rack 126. A target assembly 154 having a defined pattern or shape is affixed to each wheel of the vehicle 120.

The alignment apparatus 300 includes two optical sensing means 130 each having an interface to an electronic processing means 160. In the depicted embodiment, each of the optical sensing means 130 is a camera, and the processing means 160 is a computer system. The computer 160 preferably includes a visual display unit 172 and an operator interface or input means 174 such as a keyboard or remote input device. Computer-generated quasi-three-dimensional (3D) representation of the wheels being aligned may be depicted on the display unit 172 along with indicia of the detected alignment. In addition, the display unit 172 may depict hints or suggestions to guide the alignment technician who is performing the wheel alignment. The computer 160 also includes data storage means for storing predetermined automotive dynamic stability tolerance data.

Each of the optical sensors 130 can view at least one of the target assemblies 154 mounted on the wheels, and form an image thereof as viewed from the perspective of the sensing means. Electronic signals corresponding to the images are transferred to processing means 160 which correlates the detected perspective image of each target with the known true shape and orientation of reference data. In so doing, the computer 160 relates the perceived dimensions of certain known geometric elements on each target with the orientation and dimensions of corresponding reference data. In this manner, the alignment apparatus 300 can determine the position and attitude of each wheel 110L, 110R, 112L and 112R of the vehicle 120.

In a typical operation, the alignment apparatus 300 works generally as follows: the vehicle 120 is positioned on the alignment rack 126, which is raised to allow the alignment technician to perform the alignment; the targets 154 are mounted onto each of wheels 110L, 11R, 112L and 112R; the alignment apparatus 300 forms a detected image of each target 154; and the detected images are processed in the computer 160, which calculates the orientation of each of the targets 154. The computer 160 may also store values corresponding to the position of each detected image.

Typically, the spindle position is also located. In this operation, the computer 160 acquires images of the targets 154. The vehicle 120 is rolled back, and the computer 160 acquires a second set of images of the targets 154. The computer 160 computes the angle through which the vehicle was rolled back, and based on such calculation, determines the spindle location. Optionally, the vehicle 120 can be rolled forward and measured again as a check. The computer 160 may then calculate the actual orientation of the primary planes of each of wheels 110L, 110R, 112L and 112R. A primary plane or claw plane is an imaginary plane at an outer face of the wheel with a generally vertical orientation that is parallel to the tread of the tire that is part of the wheel.

The results of the computations described above are displayed on the display unit 172. The computer 160 may also have the display unit 172 show instructions to the alignment technician as to what corrections may need to be made to correct any detected misalignment of wheels 110L, 110R, 112L and 112R of the vehicle 120.

The computer 160 also can calculate a roll radius and a roll axis of each wheel 110L, 110R, 112L and 112R according to known methods, such as those disclosed in International Publication No. WO 01/23834, which is incorporated herein by reference. The roll radius values are then used to determine the location of the ground plane, (minus corrections for tire flex). The steering axis can be determined using an inclinometer, as is known in the art, or using the aligner, and the centerline of the wheel can be determine using an electronic wheel width caliper. Alternatively, some alignment properties, such as the roll radius, may be measured manually by the alignment technician using a measurement tape or the equivalent to determine the distance between the center of the wheel and the point on the outer edge of the wheel directly beneath the center of the wheel. This roll radius measurement may then be input to the alignment apparatus 300. The alignment apparatus 300 may perform other required measurements, and further perform calculations and/or comparisons of the results and display the results of such measurements, calculations, and comparisons.

Camber, caster, and SAI are typically measured using inclinometers attached to the wheel. With camber, the inclinometer measures the angle that the plane of the wheel makes with the vertical. To measure caster, the wheel is turned through an arc, and the difference in the camber readings is used to derive the caster value. This procedure is called a caster swing. SAI is measured in a manner similar to caster, except that the inclinometer used for the SAI reading measures the change in pitch angle of a line in the plane of the wheel as the wheel is turned through an arc.

Once the alignment measurements are determined, the alignment apparatus 300 presents resulting values on the display unit 172 for evaluation. The alignment technician can then use such results to help diagnose the condition of the vehicle, the vehicle suspension, and the wheels. In addition, the alignment apparatus 300 is preferably programmed to compare the resulting values for each wheel to the manufacturer-specified alignment properties. The alignment apparatus 300 can highlight any measurement that is not substantially equal to, or within a specified tolerance of, the manufacturer-specified value, such as by generating a warning message to alert the alignment technician.

Computer Hardware

Figure 7:
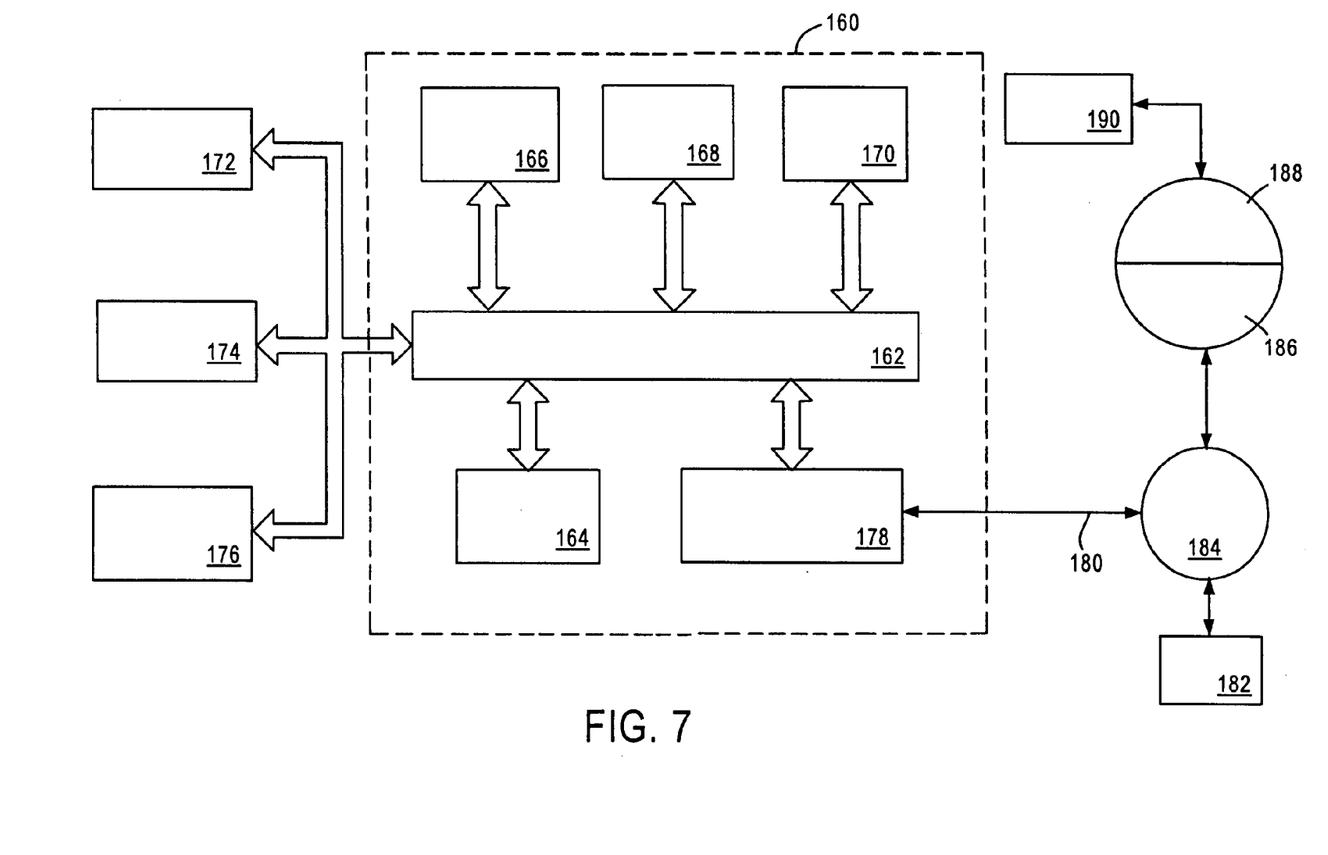
FIG. 7 is a block diagram of a computer system for use with the apparatus of FIG. 6.

FIG. 7 is a block diagram illustrating in greater detail the computer 160 for use with the alignment apparatus 300 of FIG. 4. The computer 160 includes a bus 162 or other communication mechanism for communicating information, a processor 164 coupled to the bus 162 for processing information, and a main memory 166, such as a random access memory (RAM) or other dynamic storage device, coupled to the bus 162 for storing information and instructions to be executed by the processor 164. The main memory 166 also may be used for storing temporary variables or other intermediate information during execution of instructions to be executed by the processor 164. The computer 160 also includes a read only memory (ROM) 168 or other static storage device coupled to the bus 162 for storing static information and instructions for the processor 164, and a storage device 170, such as a magnetic disk or optical disk, is provided and coupled to the bus 162 for storing information and instructions. As shown, in addition to the display 172 and the keyboard 174, the computer 160 may also include a cursor control 176, such as a mouse.

The computer 160 is used for measuring and adjusting alignment of front and rear wheels of a four wheel vehicle, by carrying out the methods 100 and 200 of the present disclosure. According to one aspect, measuring and adjusting the alignment of front and rear wheels of a four wheel vehicle is provided by the computer 160 in response to the processor 164 executing one or more sequences of one or more instructions contained in the main memory 166. Such instructions may be read into the main memory 166 from another computer-readable medium, such as the storage device 170. Execution of the sequences of instructions contained in the main memory 166 causes the processor 164 to perform the methods provided by the present disclosure. In alternative embodiments, hard-wired circuitry may be used in place of or in combination with software instructions to implement the present disclosure. Thus, the present disclosure is not limited to any specific combination of hardware circuitry and software.

The term "computer-readable medium" as used herein refers to any medium that participates in providing instructions to the processor 164 for execution. Such a medium may take many forms, including but not limited to, non-volatile media, volatile media, and transmission media. Non-volatile media includes, for example, optical or magnetic disks, such as storage device 170. Volatile media includes dynamic memory, such as the main memory 166. Transmission media includes coaxial cables, copper wire and fiber optics, including the wires that comprise bus 162. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 164 for execution. For example, the instructions may initially be carried on a magnetic disk of a remote computer. The remote computer can load the instructions into its dynamic memory and send the instructions over a telephone line using a modem. A modem local to computer 160 can receive the data on the telephone line and use an infra-red transmitter to convert the data to an infra-red signal. An infra-red detector can receive the data carried in the infra-red signal and appropriate circuitry can place the data on bus 162. The bus 162 carries the data to the main memory 166, from which the processor 164 retrieves and executes the instructions. The instructions received by the main memory 166 may optionally be stored on the storage device 170 either before or after execution by the processor 164.

The computer 160 also includes a communication interface 178 coupled to the bus 162. The communication interface 178 provides a two-way data communication coupling to a network link 180 that is connected to a local network 182. For example, the communication interface 178 may be an integrated services digital network (ISDN) card or a modem to provide a data communication connection to a corresponding type of telephone line. As another example, the communication interface 178 may be a local area network (LAN) card to provide a data communication connection to a compatible LAN. Wireless links may also be implemented. In any such implementation, communication interface 178 sends and receives electrical, electromagnetic or optical signals that carry digital data streams representing various types of information.

The network link 180 typically provides data communication through one or more networks to other data devices. For example, the network link 180 may provide a connection through local network 182 to a host computer 184 or to data equipment operated by an Internet Service Provider (ISP) 186. The ISP 186 in turn provides data communication services through the world wide packet data communication network now commonly referred to as the "Internet" 188. Local network 182 and Internet 188 both use electrical, electromagnetic or optical signals that carry digital data streams. The signals through the various networks and the signals on network link 180 and through communication interface 178, which carry the digital data to and from computer 60, are exemplary forms of carrier waves transporting the information.

The computer 160 can send messages and receive data, including program code, through the network(s), network link 180 and communication interface 718. In the Internet example, a server 190 might transmit a requested code for an application program through Internet 188, ISP 186, local network 182 and communication interface 178. In accordance with the present disclosure, one such downloaded application provides for measuring and adjusting the alignment of front and rear wheels of a four wheel vehicle as previously described.

The received code may be executed by the processor 164 as it is received, and/or stored in the storage device 170, or other non-volatile storage for later execution. In this manner, the computer 160 may obtain application code in the form of a carrier wave.

Thus, the present disclosure provides methods 100, 200 and an apparatus 300 for measuring and adjusting alignment of front and rear wheels of a four wheel vehicle. The specific methods and apparatus described in this specification have been presented by way of illustration rather than limitation, and various modifications, combinations and substitutions may be effected by those skilled in the art without departure either in spirit or scope from this disclosure in its broader aspects and as set forth in the appended claims. All methods and apparatus disclosed herein, and all elements thereof, are contained within the scope of at least one of the following claims. No elements of the presently disclosed methods and apparatus are meant to be disclaimed.

What is claimed is:

1. A method for measuring and aligning front and rear wheels of a four wheel vehicle, comprising:
   measuring alignment properties of the front wheels, and comparing the measured alignment properties to manufacturer-specified alignment properties for the front wheels;
   measuring alignment properties of the rear wheels, comparing the measured alignment properties of the rear wheels to manufacturer-specified alignment properties for the rear wheels, and correcting the alignment properties of the rear wheels if the measured alignment properties of the rear wheels are not substantially equal to the manufacturer-specified alignment properties for the rear wheels, and if all of the measurements of the alignment properties of the front wheels are substantially equal to the manufacturer-specified alignment properties for the front wheels; and correcting alignment properties of the front wheels prior to measuring and correcting alignment properties of the rear wheels, if all of the measurements of the alignment properties of the front wheels are not substantially equal to the manufacturer-specified alignment properties for the front wheels.

2. A method according to claim 1, wherein the measurements are made using a computer-aided alignment apparatus.

3. A method according to claim 2, wherein the computer-aided alignment apparatus comprises a computer-aided, three-dimensional machine vision apparatus including optical scanning devices and optically scannable targets, and the method also includes:

attaching the optically scannable targets to the wheels of the vehicle; and optically scanning the targets to measure the alignment properties of the wheels.

4. A method according to claim 1, wherein the alignment properties of the front wheels include castor angles.

5. A method according to claim 1, wherein the alignment properties of the front wheels include camber angles.

6. A method according to claim 1, wherein the alignment properties of the front wheels include a toe of the front wheels.

7. A method according to claim 1, wherein the alignment properties of the front wheels include steering angle inclination.

8. A method according to claim 1, wherein the alignment properties of the rear wheels include camber angles.

9. A method according to claim 1, wherein the alignment properties of the rear wheels include a toe for the rear wheels.

10. A method according to claim 1, further comprising adjusting the front toe so that a steering wheel of the vehicle is in a straight position, after measuring and correcting alignment properties of the rear wheels.

11. An apparatus for measuring and aligning front and rear wheels of a four wheel vehicle, comprising:

targets fixedly attachable to the wheels;

a camera for providing images of the targets;

a database containing manufacturer-specified alignment properties for the front and the rear wheels of the vehicle; and a data processor operatively connected to the camera and the database and programmed to, measure alignment properties of the front wheels based upon the images of the targets provide by the camera, compare the measured alignment properties of the front wheels to the manufacturer-specified alignment properties for the front wheels contained in the database, and generate a warning that the alignment properties of the front wheels should be corrected prior to measuring and correcting alignment properties of the rear wheels if the measured alignment properties of the front wheels are not substantially equal to the manufacturer-specified alignment properties for the front wheels.

12. An apparatus according to claim 11, wherein the data processor is further programmed to, measure alignment properties of the rear wheels based upon the images of the targets provide by the camera, compare the measured alignment properties of the rear wheels to the manufacturer-specified alignment properties for the rear wheels contained in the database; and generate a warning if the measured alignment properties of the rear wheels are not substantially equal to the manufacturer-specified alignment properties for the rear wheels.

13. An apparatus according to claim 11, wherein the alignment properties of the front wheels include castor angles.

14. An apparatus according to claim 11, wherein the alignment properties of the front wheels include camber angles.

15. An apparatus according to claim 11, wherein the alignment properties of the front wheels include a toe of the front wheels.

16. An apparatus according to claim 11, wherein the alignment properties of the front wheels include steering angle inclination.

17. An apparatus according to claim 11, wherein the alignment properties of the rear wheels include camber angles.

18. An apparatus according to claim 11, wherein the alignment properties of the rear wheels include a toe for the rear wheels.

19. An apparatus according to claim 11, wherein the data processor is further programmed to generate instructions for adjusting the front toe so that a steering wheel of the vehicle is in a straight position, after the alignment properties of the rear wheels have been measured and corrected.

20. An apparatus according to claim 11, wherein the data processor is programmed to generate instructions that the alignment properties of the rear wheels should be measured and corrected if the measured alignment properties of the front wheels are substantially equal to the manufacturer-specified alignment properties for the front wheels.

* * * * *